July 15, 1958 — M. H. M. J. WIBAULT — 2,843,340
JET AIRCRAFT
Filed Jan. 3, 1956 — 5 Sheets-Sheet 1
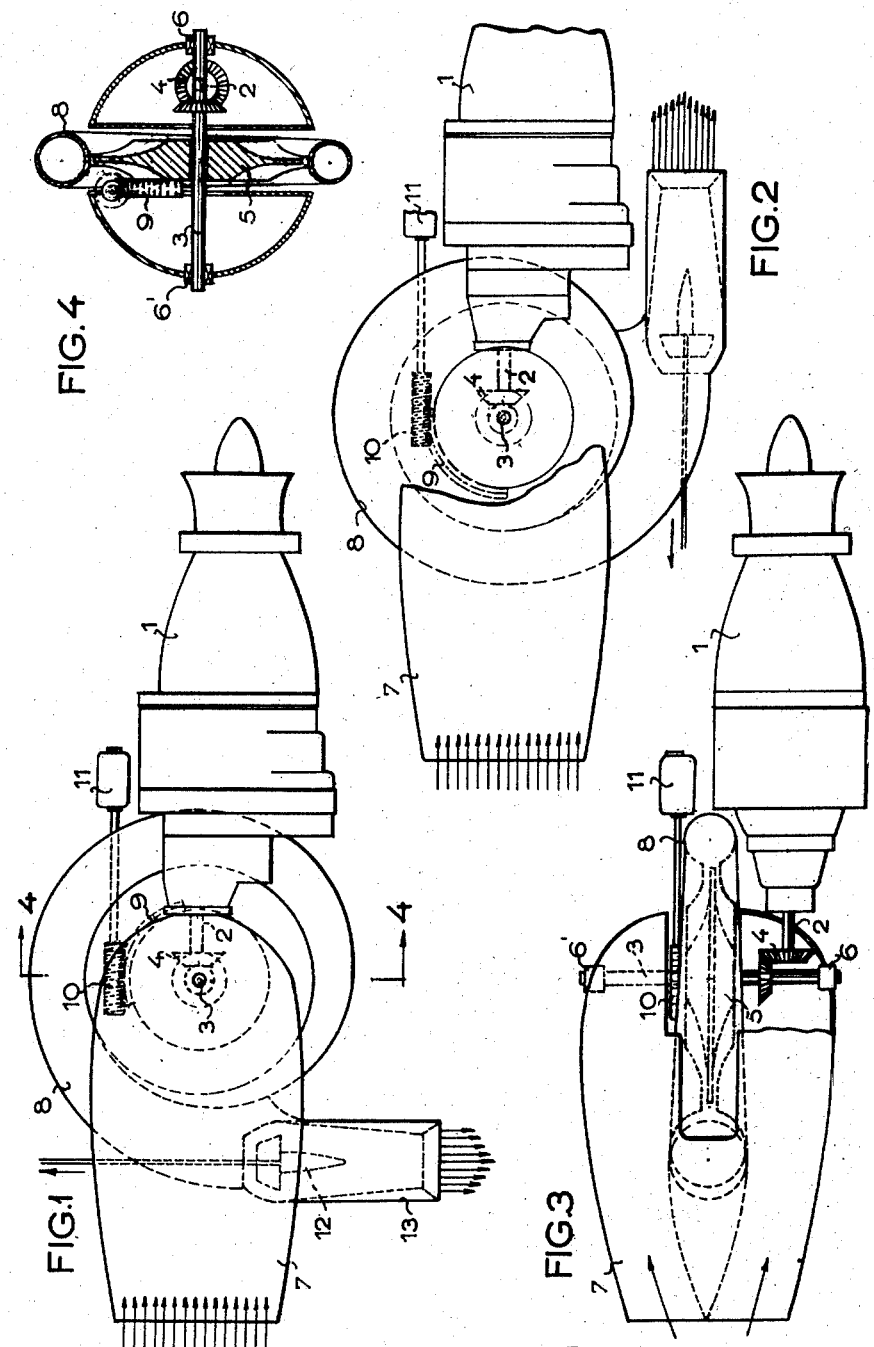
Inventor
M.H.M.J. Wibault

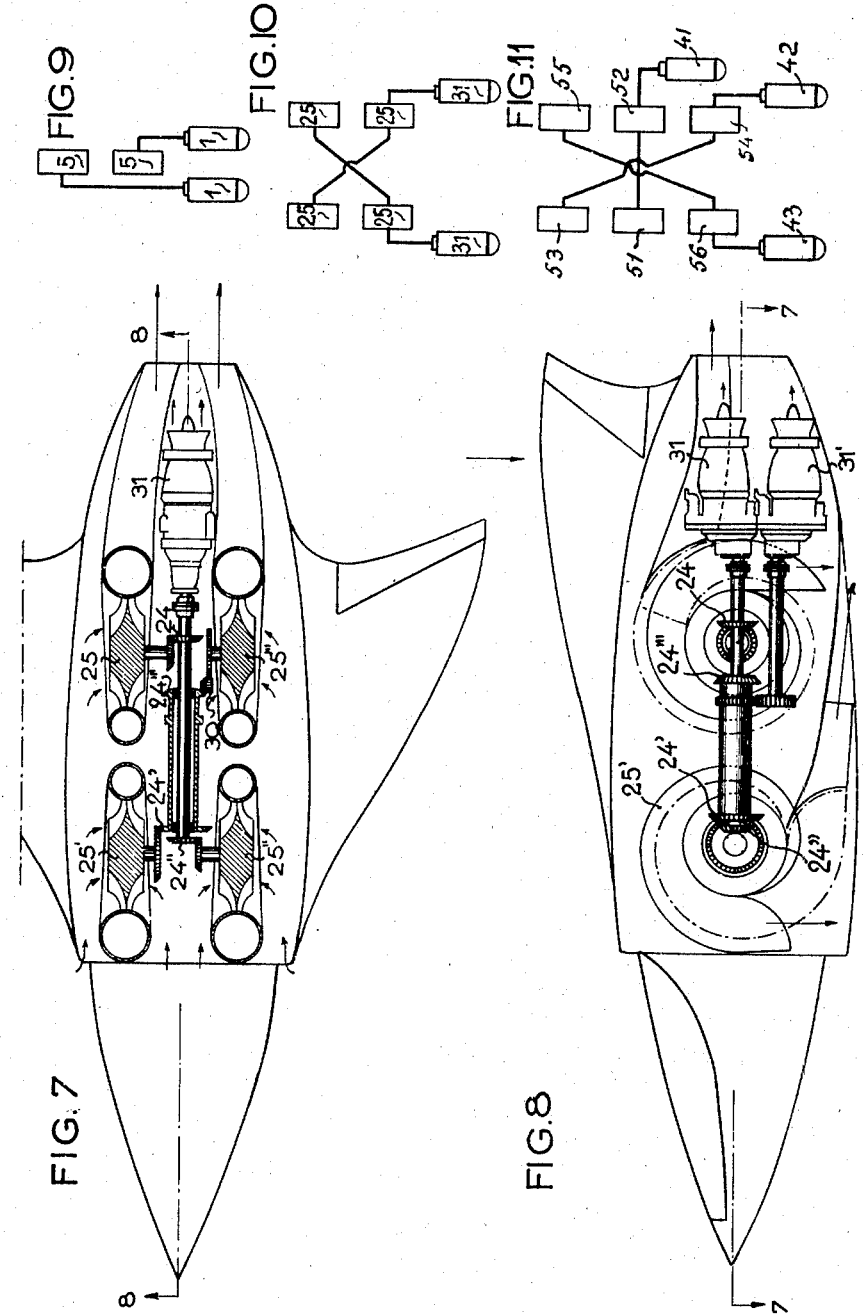

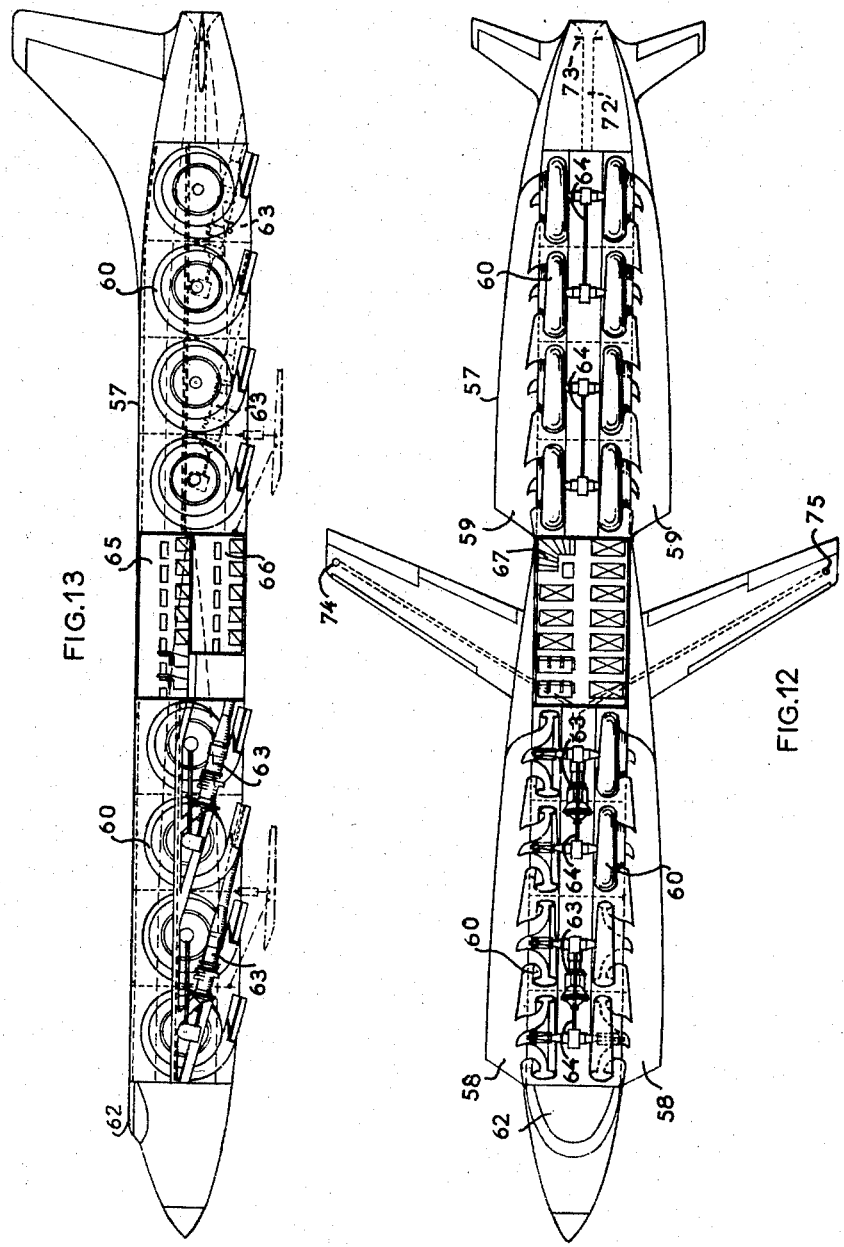

July 15, 1958 M. H. M. J. WIBAULT 2,843,340
JET AIRCRAFT
Filed Jan. 3, 1956 5 Sheets-Sheet 5
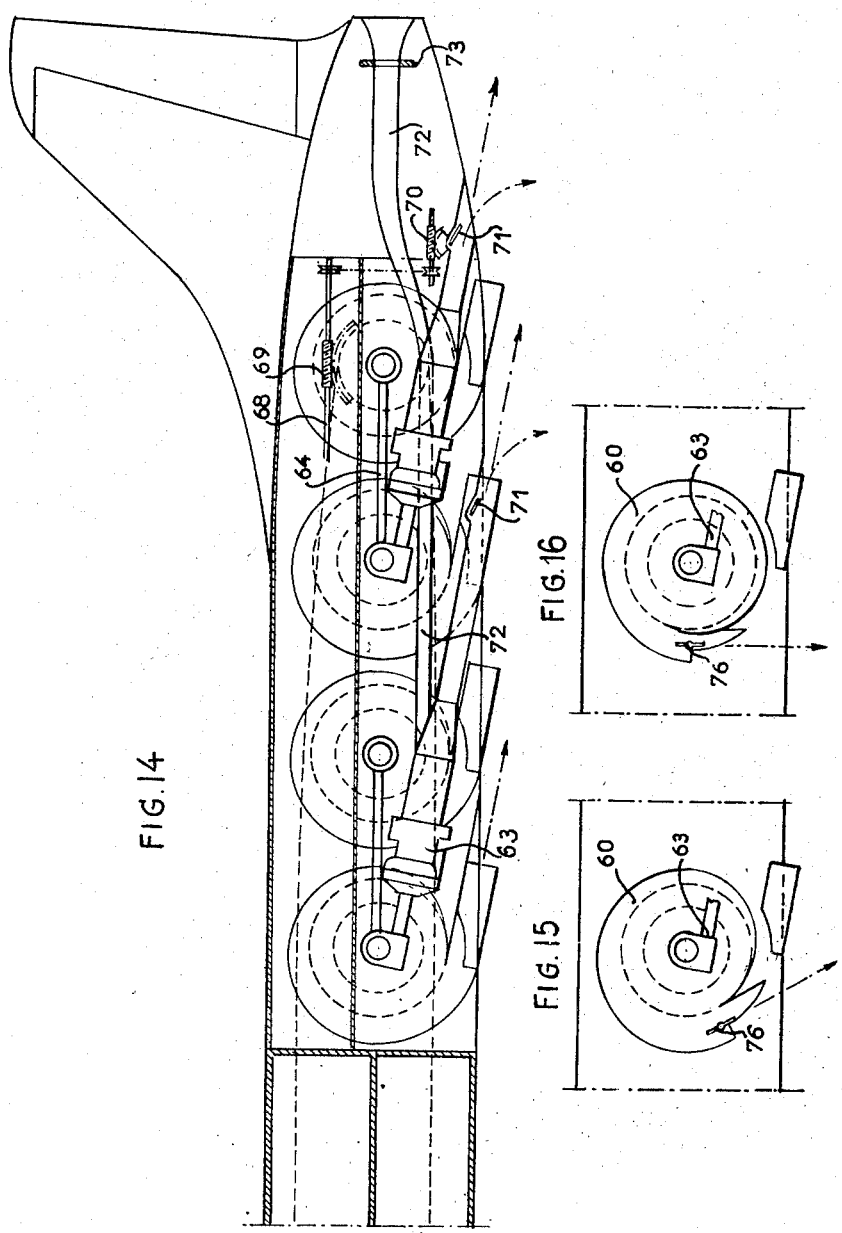
Inventor
M.H.M.J.Wibault
By Stevens Downing Pierold
Attys United States Patent Office 2,843,340
Patented July 15, 1958

2,843,340

JET AIRCRAFT

Michel Henri Marie Joseph Wibault, Paris, France

Application January 3, 1956, Serial No. 557,177

Claims priority, application France January 12, 1955

7 Claims. (Cl. 244—23)

This invention relates to jet aircraft adapted to vertical take-off and landing, while being, nevertheless, capable of normally flying in the conventional flight attitude of a usual airplane.

The main object of the invention is to provide a device to be mounted in the fuselage of an aircraft having a normally horizontal flight attitude, said device being capable of ensuring, by reaction, both the vertical lift and the usual propelling of said aircraft, said device comprising at least two centrifugal compressors having their axes parallel with the pitch axis of the aircraft and each including a spiral-shaped collector angularly displaceable around the compressor's axis, so that the air jet from the associated compressor may be oriented at will between a downward direction and a horizontal rearward direction, means to operate said compressors and control means to orient the said collectors, whereby, when the direction of the air jets of the compressors is horizontal, said device ensures a horizontal propelling of the aircraft, while, when said air jets are vertical, said device tends to lift said aircraft vertically, either for take off or for landing, or again in hovering flight.

Another object of the invention is to provide an aircraft equipped with the above described device, wherein each lifting-propelling compressor is driven by a separate power unit, the various power units and compressors being so designed and arranged, in any orientation of the compressors jets that the resultant force acting on the fuselage passes approximately through the centre of gravity of the aircraft.

A further object of the invention is to provide an aircraft of the type described, wherein the lifting-propelling compressors are arranged in sets, each comprising at least two compressors, each one of said compressor sets being driven by a common power unit, said compressors and said power units being so designed and arranged that, in any orientation of the compressor jets, the resultant force acting on the fuselage passes approximately through the centre of gravity of the aircraft.

A more specific object of the invention is to provide, in an aircraft of the type described two rows of lifting-propelling compressors symmetrically arranged in respect to the median vertical plane of symmetry of the aircraft, said compressors being operated by power units, each power unit driving the same number of compressors in each one of said rows.

The arrangement of said compressors and power units is such that, on the one hand, in any orientation of the compressors jets, the resultant of the forces acting on the fuselage passes approximately through the centre of gravity of the aircraft while, on the other hand, a failure of one of the said power units does not create a lack of equilibrium in the thrust.

Still another object of the invention is to provide a device of the type described, wherein at least two compressors fitted with spiral-shaped collectors, adapted to ensure the lift and propelling of the aircraft, are disposed in longitudinal alignment with each other, in such a manner that, in any orientation of the compressor-jets, the resultant of the forces acting on the fuselage approximately passes through the centre of gravity of the aircraft.

Another advantage of the above described arrangement of the lifting-propelling centrifugal compressors, in two rows extending in direction parallel to the roll axis of the aircraft, is that, if one compressor of one row has a failure, it suffices to slightly reduce the rating of all compressors of the other row to re-establish a suitable thrust equilibrium.

Still a further object of the invention is to bring the air compressed in the compressors into combustion chambers fed in fuel by means of suitable injectors, whereby the dynamic thrust of the fluid is increased by yielding of thermal energy, the conversion of which into a thrust takes place at the outlet of said combustion chambers.

Still another object of the invention is to drive the lifting-propelling compressors of the device according to the invention, by turbo-jets actuating each compressor through a suitable transmitting bevel gear.

Still a further object of the invention is to control the angular displacements of the spiral-shaped collectors of the lifting-propelling compressors by means of servo-controls acting on each of said collectors through a rack-and-pinion gear.

Still another object of the invention is to drive the compressors by means of turbo-jets provided with jet deflecting means, capable of controlling the orientation of the jets in a vertical plane, the said deflecting means being actuated by control means synchronized with those provided to control the orientation of the spiral-shaped collectors, so that the directions of the jets always remain substantially parallel with the directions of the air-jets from the compressors, whereby the thrusts of the turbo-jets and compressor-air jets act additively during the normal horizontal flight, during take-off and during landing.

In normal flight conditions, the aircraft is stabilized, as usual, by means of rudders and ailerons. This type of stabilization is known as "external stabilization." Now, during take-off, during landing, in a low speed flight, or, in other words, whenever the speed of the aerodyne is so reduced that the rudders and ailerons are not capable of ensuring the stabilization of the aircraft with a sufficient efficiency, there are provided, according to another object of the invention, derivations of the output gases from above mentioned turbo-jets, capable of bringing a fraction of said gases, on the one hand, to the rear end of the aircraft where, by deflecting them horizontally and/or vertically, by suitable deflecting means, an additional yaw and pitch stabilization may be obtained, and, on the other hand, to the tips of the wings where, by directing them upwardly at one of said tips and downwardly at the other one, an additional roll stabilization may be obtained.

An alternative object of the invention is to ensure the above described additional stabilization by using gases generated by a special pressure-fluid generator, provided for this purpose, instead of using gases deviated from the output gases of the turbo-jets.

Still another object of the invention is to provide the compressors with inlet and/or outlet throttle means, so that, by means of suitable controls, automatic or not, the air flow through at least certain compressors may be stopped so that said compressors are then made inoperative. This "short-circuiting" of certain compressors may be, in particular, used in cruising flight, to regulate the general compressor outputs and to avoid the phenomenon known under the name of panting effect.

Another object of the invention is to provide an aircraft of the type described provided with a landing gear adapted to landing on any kind of landing ground, said landing gear comprising two landing skids articulated on oleo-pneumatic shock-absorbers, said landing-skids being retractable during flight and being provided with retractable braking means and with shock absorbers for elastically resisting angular displacements of said skids.

Preferred embodiments of the invention will be hereinafter described with reference to the accompanying drawings, given merely by way of example and in which:

Figure 1 is a diagrammatic, partly sectional, view of a portion of an element of the device according to the invention.

Figure 2 diagrammatically shows the same portion of the same element during another stage of the operation.

Figure 3 is a diagrammatic plan view with parts broken away of the same portion of the same element.

Figure 4 is a diagrammatic sectional view along line 4—4 of Figure 1.

Figure 7 is a diagrammatic horizontal section of an aircraft provided with another embodiment of the device according to the invention.

Figure 8 is a diagrammatic vertical section of the same aircraft along line 8—8 of Figure 7.

Figure 5:
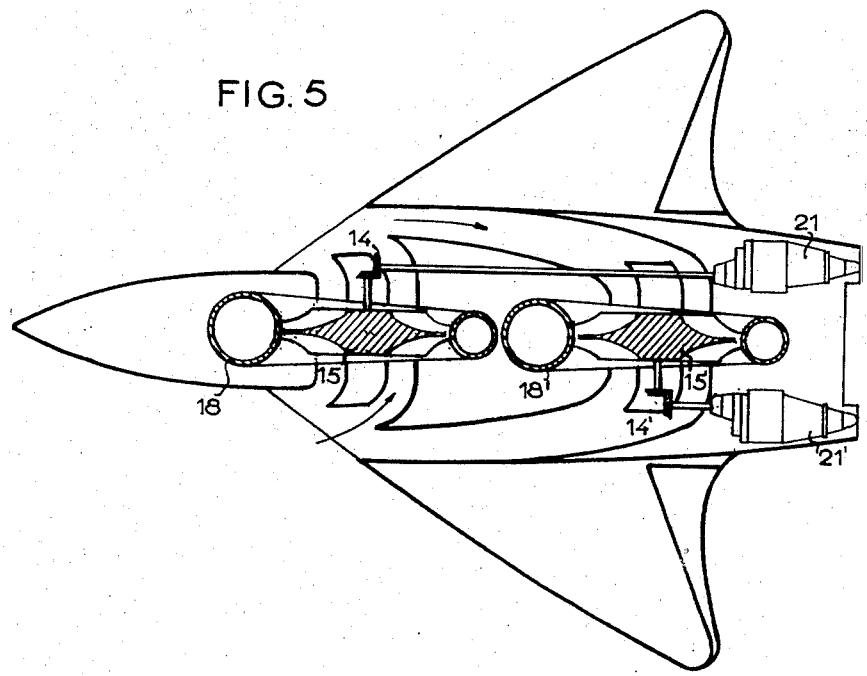
Figure 5 is a diagrammatic horizontal section of the aircraft provided with a device according to the invention.

Figures 9, 10 and 11 diagrammatically show three specific ways of driving the compressors.

Figure 12 is a horizontal section of the aircraft.

Figure 13 is a vertical section of the same.

Figure 14 is a vertical section of a portion of the same aircraft.

Figures 15 and 16 respectively show two positions of a compressor in two different flight conditions.

On Figures 1 to 4, one of the compressors of the device according to the invention has been shown. On these figures, 1 is a turbo-jet the primary shaft 2 of which drives the axle 3 of the compressor through a suitable bevel-gear 4. The axle 3, on which the rotor 5 of the compressor is keyed, is journalled on bearings 6 and 6' mounted in the walls of the nozzle 7, through which the air penetrates into the compressor and into the turbo-jet. 8 is the spiral-shaped collector of the compressor; said collector may be angularly displaced and its angular position is determined by a toothed segment 9 on which it is keyed, the said segment meshing with a tangential screw 10 actuated by a servo control device diagrammatically shown at 11. The relative positions of the toothed segment and of the tangential screw are such that, upon said angular displacement, the direction of the air-jet is brought from the vertical position shown in Figure 1 into the horizontal position shown in Figure 2. The tangential discharge end of collector 8 may be continued by a conventional burner or combustion chamber 13 in which fuel is injected, as schematically indicated by dot and dash lines 12, and the fuel-air mixture ignited in any suitable manner (not shown) to increase the thrust and power of the reactive stream produced by the centrifugal air compressor.

Figure 5 is a horizontal section of a lifting-propelling group comprising two centrifugal compressors, the rotors of which are shown in 15 and 15', respectively, while their spiral-shaped collectors are indicated at 18 and 18' respectively.

Figure 6:
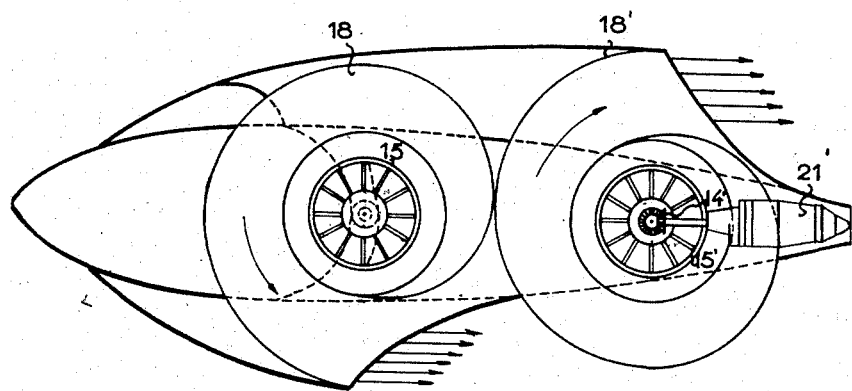
Figure 6 is a diagrammatic view of the same device.

The compressors 15 and 15' are driven by turbo-jets 21 and 21', respectively, the motion being transmitted by means of two bevel-gears 14 and 14'. The arrows indicate the air flows feeding the compressors. The means to control the angular position of the collectors are omitted on Figures 5 and 6. The same device is shown in a diagrammatic vertical sectional view on Figure 6, wherein the arrows indicate the directions of the air-jets at the outlets of the collectors. Figure 7 is a diagrammatic section in the horizontal plane containing the pitch axis of the aircraft, while Figure 8 is a diagrammatic vertical section along line 8—8 of Figure 7 of an aircraft equipped with a device according to the invention.

In said aircraft, the lifting-propelling system is constituted by four compressors, the rotors 25, 25', 25", 25'" of which are driven by two turbo-jets 31, 31'.

The turbo-jet 31 mounted on the fuselage drives the rotors 25 and 25" through bevel gears 24 and 24" respectively. The turbo-jet 31' drives the rotors 25' and 25'" through bevel gears 24' and 24'", respectively, and through a pinion 30. In Figure 7, the arrows indicate the air-flow feeding the compressors.

On Figure 8, the arrows indicate the direction of the air jets generating the required thrusts. The horizontal arrows relate to the case when the lifting-propelling device has a propelling action ensuring horizontal flight of the aerodyne, while the vertical arrows correspond to vertical flight either during take-off or during landing or, again, in hovering flight of the aircraft.

In Figures 9, 10 and 11 are diagrammatically shown different ways of driving the compressors.

In the case of Fig. 9, two compressors 5, located in the vertical plane containing the roll axis of the aircraft are aligned longitudinally; they are driven by two power units 1.

In Fig. 10, are shown four compressors 25 driven by two turbo-jets 31. It is the same case as in Figs. 7 and 8 as described above.

In Fig. 11 three power units 41, 42, 43, respectively drive compressors 51 to 56.

With this arrangement, a suitable thrust equilibrium is maintained in case of failure of one of the power units. Since such a failure would render simultaneously inoperative two compressors having symmetric thrusts, equilibrium of the remaining elements of the lifting-propelling system would not be affected.

In Figs. 12 to 16, the reference numeral 57 shows the fuselage. On each side of said fuselage are provided two air intakes, 58 and 59, respectively. The compressors and their spiral-shaped collectors identified by the reference numeral 60 are arranged with their axes at right angles to the vertical plane of symmetry of the aircraft, they are arranged in symmetrical groups on both sides of said plane. Each group comprises two pairs of compressors, namely a fore pair and a rear pair. The two compressors in each pair have the same axle.

The fore pair of compressors in each group are driven by the turbo-jet 63 (for instance, of the Bristol BE 25 type) while, the rear pair of compressors is driven by the fore pair through a mechanical transmission 64. The turbo-jets 63 are directed toward the rear of the aircraft.

A corridor is extending throughout the length of the aircraft above the axles of the compressors.

The cockpit 62 is located in the fore end of the aircraft. Behind the cockpit are located the first two lifting propelling units, each comprising four compressors with spiral-shaped collectors and one turbo-jet obliquely positioned in the fuselage. In each unit, the turbo-jets are driving directly the two power compressors. A mechanical transmission 64 connects said two fore compressors to the two rear compressors in the same unit.

Behind these two units is located the space for passengers, divided in two decks indicated at 65 and 66 and connected by a stairway 67. Further behind are located two further lifting-propelling units in every respect identical with the fore ones. The wings are attached on each side to the fuselage and their axis is located below and ahead of the upper passengers' deck. They contain the fuel.

The reference numeral 68 (Fig. 14) diagrammatically shows the control rod for orienting the air outlet from the spiral shaped collectors by pivoting them on the axis of their compressors by means of the rack screws 69. The rod 68 also rotates through a chain drive, a further rack 70 for controlling the member 71 for deviating the outlet gases discharged by the corresponding turbo-jet. The aforesaid control is so designed that the directions of the gases from the turbo-jet are always substantially parallel to the directions of the air jets from the compressors. The aforesaid racks are shown in Fig. 14 on a single compressor and a single turbo-jet only, for the sake of clarity. Identical devices, synchronized with the one represented, are provided on each compressor and on each turbo-jet which constitute the lifting-propelling units. They may all be controlled through the same control rod 68. One portion of the gases is bled at the exit from the turbo-jets by means of a pipe 72 (one portion of which only is shown in Fig. 14) in order to be led to the rear of the aircraft. In order to stabilize the aircraft with respect to the pitch and yaw axes, a deflecting device may be provided in the jet tube 72 to produce both a transverse force applied to said tube and a deflection of the jet discharging therefrom. Such deflecting device may be constituted by at least one movable interceptor element 73 disposed in a recess formed in the wall of the jet tube 72 and which may be made to penetrate the jet in a radial direction by means of any suitable actuating system to thereby change the distribution of the pressures along the corresponding wall portion of the jet tube so as to produce said deflection.

The stabilisation with respect to the roll axis is ensured by another portion of the gases also bled at the exit of the turbo-jets and led to the wing tips, whence they escape upwardly from the right wing and downwardly from the left wing respectively, or vice versa. Both exhaust orifices in the wing tips will be seen at 74 and 75 (Fig. 12). A rolling torque in the desired angular direction is thereby produced.

As has been mentioned above, the new method of stabilization permits to control the flight attitude of the aircraft when the same evoluates at speeds at which the usual controls efficiency may not be sufficient.

The take-off of the aircraft shown in Figures 12 to 16, can be ensured in two different ways, according to the load carried by the same.

In normal conditions, i. e. when the load is not high, the take-off can be obtained simply by the combined thrust of the compressors and the turbo-jets deviated as mentioned above in parallel with said compressors jets. In Figure 16 is shown the corresponding position of a compressor's collector. Once the aircraft has been brought to a certain altitude, the direction of the jets (i. e. the compressors air jets and the deviated gases of the turbo-jets) is progressively changed, so as to be ultimately brought to the one shown in Figures 12 to 14.

While in the embodiment of Figures 1 to 8 the angle of orientation of the collectors has been shown as being of 90°, in the embodiment of Figures 12 to 16 said angle is approximately of 80°, so that the direction of the jets can be shifted from the vertical to one forming about 10° with the horizontal.

The angular displacement of the collectors around the axes of the corresponding compressors is synchronized with the one of the jet deviators 71, provided on the turbojets, as mentioned above.

It is particularly intended, according to another feature of the invention, to ensure the aircraft stabilization, at this stage of flight, by means of gases bled from the turbojets and directed towards the rear of the plane and the wings tips as has been mentioned above. Naturally, with the increase of the speed of the aircraft, the usual controls becoming progressively more effective, the stabilization mentioned above becomes progressively less efficient and can be suppressed.

It is particularly provided, as has been also mentioned above, to switch off a certain number of compressors (naturally by bringing out of action the same number of compressors on both sides of the vertical plane of symmetry of the plane) in order to obtain the desired cruising speed.

Now, if the aircraft is over-loaded, the take-off can still be ensured, due to the present invention. In this case, the compressors (as well as the jet deviators) are brought in the angular position corresponding to the normal flight.

Once the plane has reached a certain speed along the ground, the jets are progressively brought in the vertical direction so that the combined effects of the sustentation ensured by the wings, after a certain speed has been attained, and the sustentation given by the jets suffices to ensure the take-off.

Once a proper altitude has been thus obtained, the jets are again progressively brought in the normal angular position.

The vertical landing is ensured by the jets directed vertically, the stabilization being ensured by the gases bled from the turbo-jets, as explained above.

What I claim is:

1. In an aircraft, a propulsion system comprising, in combination, at least one turbo-compressor unit obliquely inclined with respect to the line of flight for producing a normally rearwardly and downwardly directed propulsion jet, at least one additional centrifugal air compressor including a rotor driven by said turbo-compressor unit and a spiral-shaped collector designed to discharge the air stream produced by said additional compressor in a substantially tangential direction relative to said rotor, the axis of said rotor extending substantially parallel to the pitch axis of the aircraft and said collector being mounted for rotation about said rotor axis between a position in which it discharges said air stream towards the ground and a position in which it discharges said air stream rearwardly, adjustable means for deflecting said jet from said normal direction thereof to a vertical downward direction, and control means to effect simultaneous adjustment of said jet deflecting means and of said collector to direct both said jet and said air stream in substantially parallel relationship either rearwardly so that said jet and said air stream produce a combined horizontally forward propulsion thrust component, or towards the ground so that said jet and said air stream produce a combined lifting force on the aircraft.

2. A propulsion system according to claim 1, in which the discharge end of said collector forms an open ended combustion chamber, a fuel nozzle being provided to inject fuel for combustion thereof in said combustion chamber.

3. In an aircraft, a propulsion system comprising, in combination, a plurality of turbo-compressor units obliquely inclined with respect to the line of flight for producing each a normally rearwardly and downwardly directed propulsion jet, and an even number of additional centrifugal air compressors arranged in two rows symmetrically disposed in respect to the longitudinal vertical plane of symmetry of the aircraft, said additional compressors including each a rotor driven by a corresponding one of said turbo-compressor units and a spiral-shaped collector designed to discharge the stream produced by said rotor in a substantially tangential direction relative to said rotor, the axis of the rotor of each additional compressor extending substantially parallel to the pitch axis of the aircraft, and said collector of each additional compressor being mounted for rotation about said rotor axis between a position in which it discharges the air stream produced by said rotor towards the ground and a position in which it discharges said air stream rearwardly, adjustable means for deflecting said jet from said normal direction thereof to a vertical downward direction, and control means to effect simultaneous adjustment of said jet deflecting means and of said collector to direct both said jet and said air stream in substantially parallel relationship either rearwardly so that said jet and said air stream produce a combined horizontally forward propulsion thrust component, or towards the ground so that said jet and said air stream produce a combined lifting force on the aircraft, each turbo-compressor unit driving the same number of additional compressors in each of said two rows, whereby the total thrust of one of the rows of additional compressors is always substantially equal to the thrust of the other row even in case of failure of any of said turbo-compressor units.

4. A turbo-jet power plant according to claim 3, wherein said spiral-shaped collector is provided with a combustion chamber fed with air compressed by the corresponding compressor and with fuel.

5. In an aircraft having a fuselage and wings secured thereto, a propulsion system comprising, in combination, a plurality of turbo-compressor units mounted in said fuselage to produce each a normally rearward and downward directed jet having a vertical upward lift component and a horizontally forward propulsion thrust component, means for angularly adjusting said jets between said normal direction and a vertical downward direction to thereby vary said components, a number of pairwise disposed additional centrifugal air compressors housed in said fuselage, means to drive two of said additional air compressors from one of said units, each of said additional compressors including a rotor and a spiral-shaped collector mounted for rotation about said rotor between a position in which it discharges the air stream produced by the rotor towards the ground to thereby assist the vertical lift thrust produced by said jets and a position in which it discharges said air stream rearwardly to thereby assist said propulsion thrust component of the jets, and control means to effect simultaneous adjustment of said jet adjusting means and of said collectors to always maintain the direction of the air streams discharged by said collectors and of the jets discharged by said turbo-compressor units in a general parallel relationship.

6. A propulsion system according to claim 3, further comprising a discharge nozzle at the aft end of the fuselage for discharging a propulsive jet rearwardly therefrom, and duct means leading from said turbo-compressor units to said nozzle for diverting a part of the combustion gases from said units and directing the same to the nozzle for discharge therefrom.

7. In an aircraft, a propulsion system comprising a turbo-compressor unit obliquely inclined with respect to the line of flight to produce a normally rearwardly and downwardly directed jet, means for deflecting said jet from said normal direction to a vertical downward direction, a pair of additional centrifugal air compressors including each a rotor driven by said turbo-compressor unit and means to discharge the air stream produced by said rotor in a substantially tangential direction relative to the rotor, said discharge means being adapted to vary the direction of said air stream relative to the aircraft between a direction in which said air stream forms with said line of flight an angle of substantially 10° and a direction in which said air stream forms with said line of flight an angle of substantially 90°, and control means to effect simultaneous adjustment of said jet deflecting means and said discharge means to maintain the direction of said air streams in always parallel relation with the direction of said jet.

References Cited in the file of this patent

UNITED STATES PATENTS

| | | |
|---|---|---|
| 1,172,991 | Heidbreder | Feb. 22, 1916 |
| 1,735,115 | Higgins | Nov. 12, 1929 |
| 2,451,008 | Williams | Oct. 12, 1948 |
| 2,587,649 | Pope | Mar. 4, 1952 |

FOREIGN PATENTS

| | | |
|---|---|---|
| 720,394 | Great Britain | Dec. 22, 1954 |